United States Patent
Kobilka et al.

(10) Patent No.: US 11,196,054 B2
(45) Date of Patent: Dec. 7, 2021

(54) PROTON EXCHANGE MEMBRANE MATERIALS

(71) Applicant: International Business Machines Corporation, Armonk, NY (US)

(72) Inventors: Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1436 days.

(21) Appl. No.: 14/875,924

(22) Filed: Oct. 6, 2015

(65) Prior Publication Data

US 2017/0098828 A1    Apr. 6, 2017

(51) Int. Cl.
*H01M 8/1004* (2016.01)
*H01M 8/1018* (2016.01)
*H01M 4/88* (2006.01)
*H01M 4/92* (2006.01)

(52) U.S. Cl.
CPC ......... *H01M 4/8878* (2013.01); *H01M 4/92* (2013.01); *H01M 8/1004* (2013.01); *H01M 8/1018* (2013.01); *H01M 2250/20* (2013.01); *H01M 2300/0082* (2013.01); *Y02T 90/40* (2013.01)

(58) Field of Classification Search
CPC .... H01M 4/8878; H01M 4/92; H01M 8/1004; H01M 8/1018; H01M 2300/0082; H01M 2250/20
See application file for complete search history.

(56) References Cited

U.S. PATENT DOCUMENTS

| 5,702,839 A | * | 12/1997 | Frost | H01M 4/86 427/115 |
| 7,901,829 B2 | * | 3/2011 | Debe | H01M 4/86 429/483 |
| 8,168,558 B2 | | 5/2012 | Chien et al. | |
| 2007/0238009 A1 | * | 10/2007 | Alexandrovichserov | H01M 4/925 429/483 |

(Continued)

FOREIGN PATENT DOCUMENTS

| CN | 1889295 A | 1/2007 |
| CN | 100386910 C | 5/2008 |

(Continued)

OTHER PUBLICATIONS

Vorobyev, et al., Multifunctional Surfaces Produced by Femtosecond Laser Pulses, Journal of Applied Physics 117, 033103 (2015), 6 pp.

*Primary Examiner* — Stewart A Fraser
*Assistant Examiner* — Claire L Roe
(74) *Attorney, Agent, or Firm* — Patterson + Sheridan, LLP

(57) ABSTRACT

In an example, a process includes applying a platinum catalyst ink solution to a polymeric substrate to form a platinum-coated polymeric material having a first catalytic surface area. The process further includes utilizing a laser to process a portion of the platinum-coated polymeric material to form a patterned platinum-coated proton exchange membrane (PEM) material. The patterned platinum-coated PEM material has a second catalytic surface area that is greater than the first catalytic surface area.

9 Claims, 3 Drawing Sheets

(56) References Cited

U.S. PATENT DOCUMENTS

Figure 1:
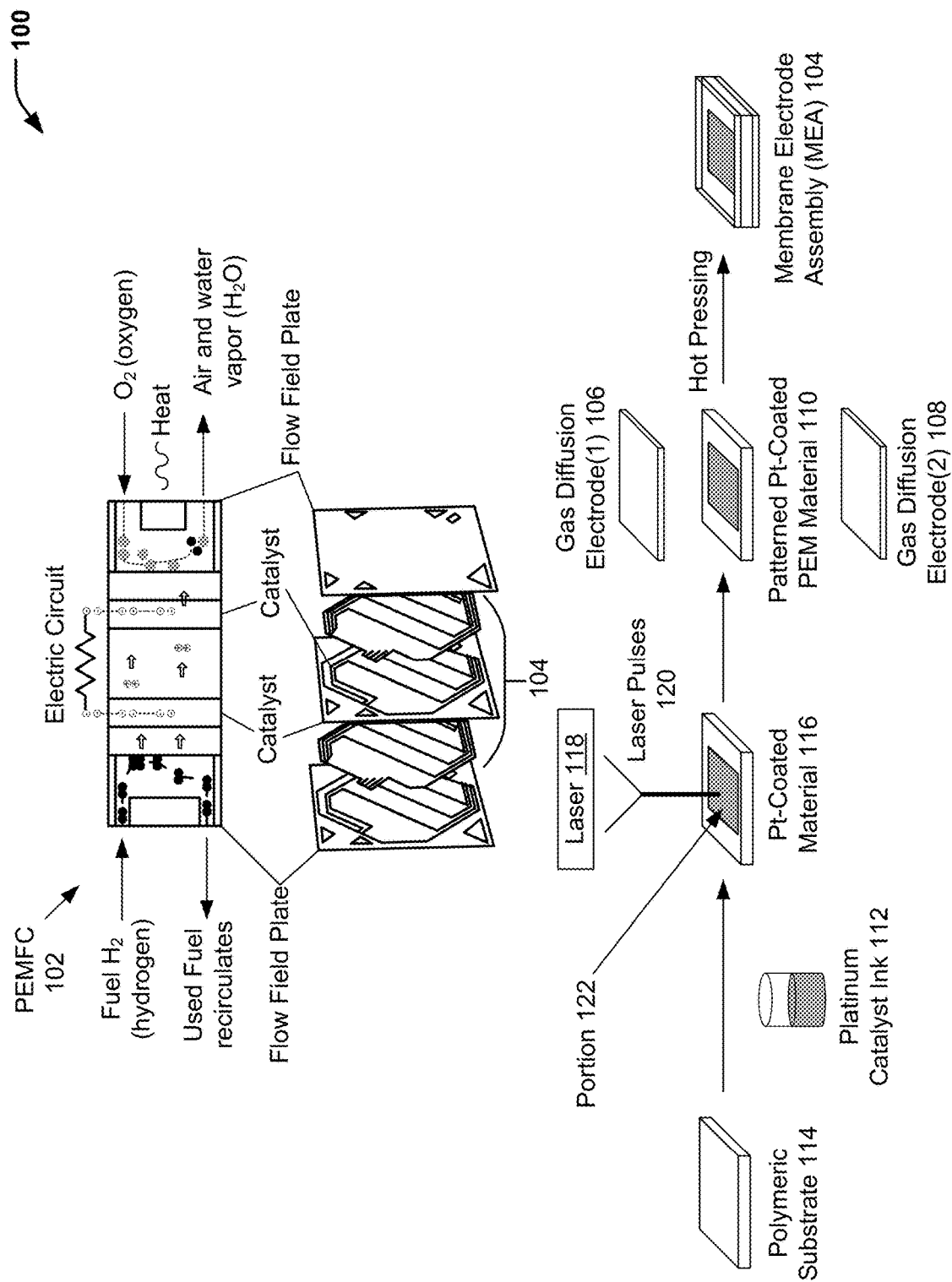

| | | | | |
|---|---|---|---|---|
| 2008/0178991 A1* | 7/2008 | Mah | ........................ | B32B 37/26 |
| | | | | 156/182 |
| 2008/0241604 A1* | 10/2008 | Moore | ................ | H01M 8/0289 |
| | | | | 429/424 |
| 2013/0004885 A1* | 1/2013 | Strmcnik | ................ | C23C 22/02 |
| | | | | 429/524 |

FOREIGN PATENT DOCUMENTS

| | | | |
|---|---|---|---|
| CN | 102294239 | A | 12/2011 |
| CN | 102294239 | B | 9/2012 |
| CN | 103606687 | A | 2/2014 |
| CN | 103657649 | A | 3/2014 |
| CN | 102903944 | B | 8/2014 |
| JP | 4861849 | B2 | 1/2012 |

* cited by examiner

PROTON EXCHANGE MEMBRANE MATERIALS

I. FIELD OF THE DISCLOSURE

The present disclosure relates generally to proton exchange membrane materials.

II. BACKGROUND

A proton exchange membrane (PEM) fuel cell (PEMFC) is a type of fuel cell that may be useful in a variety of application types, including portable, stationary, and transport application types. In a portable application type, a fuel cell unit may be built into, or charge up, products that are designed to be moved, including auxiliary power units. In a stationary application type, a fuel cell unit may provide electricity (and sometimes heat) but is not designed to be moved. In a transport application type, a fuel cell unit may provide propulsive power or range extension to a vehicle.

In a proton exchange membrane fuel cell, a fuel source (e.g., hydrogen) is applied to an anode side of the fuel cell. The fuel diffuses through the anode and is converted to protons and electrons by a catalyst. The protons flow through a proton exchange membrane and the electrons travel through an external circuit to the cathode, thus creating an electrical circuit. The protons that flow through the PEM, the electrons on the cathode side, and oxygen gas react to form water as a by-product. In some cases, precious metals may be used as catalyst materials (e.g., on the anode side of the PEM). There is a need to reduce the cost associated with the use of precious metal catalyst materials in order for PEMFCs to be competitive with other technologies, such as internal combustion engines.

III. SUMMARY OF THE DISCLOSURE

According to an embodiment, a process includes applying a platinum catalyst ink solution to a polymeric substrate to form a platinum-coated polymeric material having a first catalytic surface area. The process further includes utilizing a laser to process a portion of the platinum-coated polymeric material to form a patterned platinum-coated proton exchange membrane (PEM) material. The patterned platinum-coated PEM material has a second catalytic surface area that is greater than the first catalytic surface area.

According to another embodiment, an article of manufacture includes a patterned platinum-coated PEM material.

According to another embodiment, a proton exchange membrane fuel cell (PEMFC) is disclosed. The PEMFC includes a first gas diffusion electrode, a second gas diffusion electrode, and a patterned platinum-coated PEM material. The patterned platinum-coated PEM material is disposed between the first gas diffusion electrode and the second gas diffusion electrode.

One advantage of the present disclosure is the ability to increase the catalytic efficiency of a platinum-coated material, such as a platinum-coated PEM material for use in a PEMFC, by patterning a portion of the platinum-coated material utilizing a laser. Another advantage of the present disclosure is the ability to reduce an amount of platinum catalyst material in the platinum-coated PEM membrane material. A further advantage of the present disclosure is the ability to avoid the hazards/drawbacks associated with the use of nanomaterials.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

Figure 2:
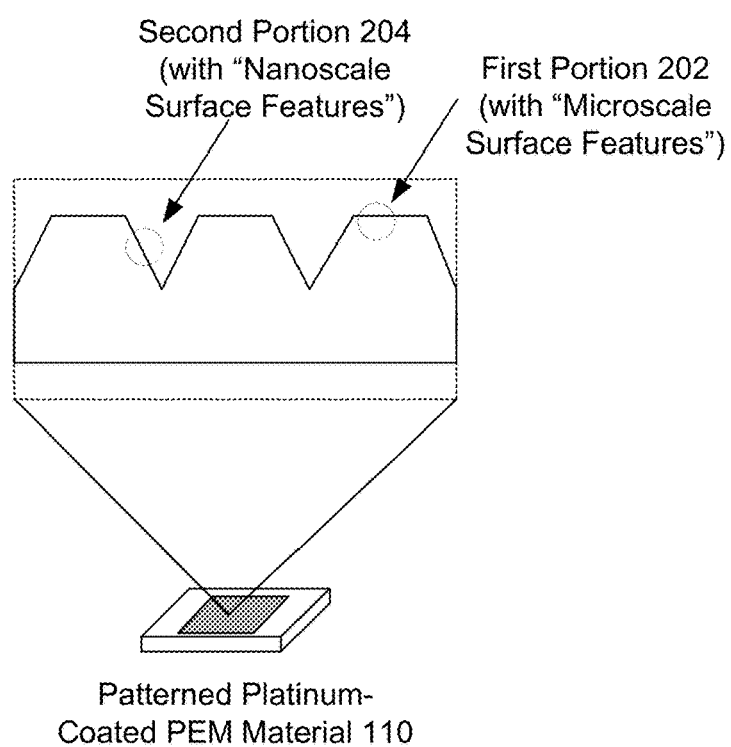
Figure 3:
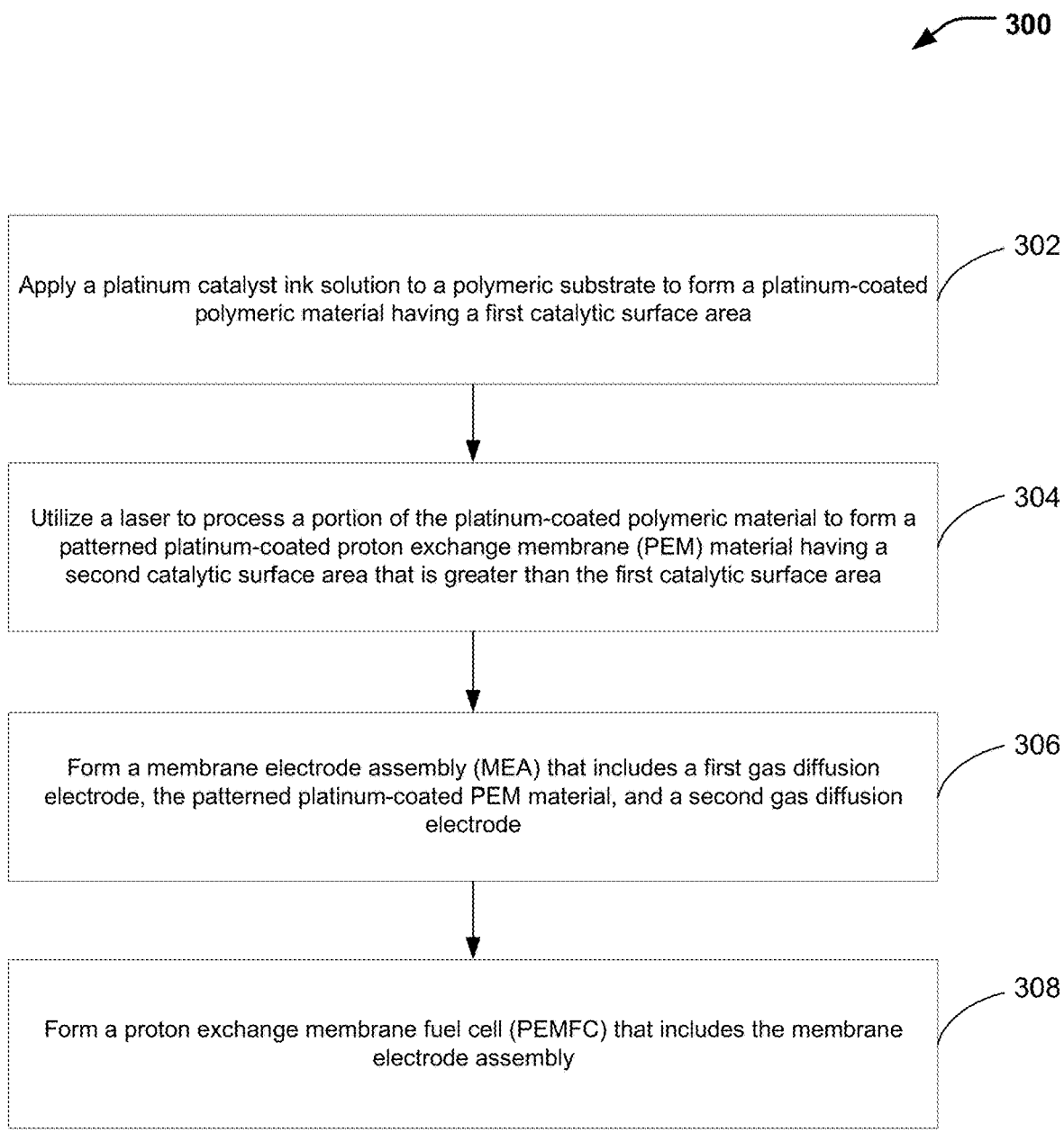

FIG. 1 is a diagram illustrating a process of forming a patterned platinum-coated PEM material for use in a PEMFC, according to one embodiment;

FIG. 2 is a diagram illustrating that laser processing of a portion of a platinum-coated polymeric material that includes a first set of surface features results in formation of a second set of surface features in the laser processed portion, according to one embodiment; and FIG. 3 is a flow diagram showing a particular embodiment of a process of forming an article of manufacture that includes a patterned platinum-coated PEM material.

V. DETAILED DESCRIPTION

In a PEMFC, a combination of electrodes, electrolyte, catalyst, and gas diffusion layers is often referred to as a "membrane electrode assembly" (MEA). In some cases, an MEA may be formed by spraying or painting an ink of catalyst (e.g., platinum), carbon, and electrode (also referred to as "catalyst ink" or "platinum catalyst ink") onto a solid electrolyte, and hot pressing carbon paper on both sides in order to protect the inside of the cell and also act as electrodes. A commonly used catalyst for PEMFC is a carbon-supported platinum particle catalyst. One method for increasing the efficiency of the platinum catalyst is to optimize particle size and shape and/or to alloy the platinum with other metals to increase the catalytic activity. By modifying the platinum particle's size and shape, increased catalytic surface area may be achieved. For size/shape modification, additional processing steps may be used to generate smaller particle size. In some cases, platinum may be deposited on high surface area carbon. One drawback of this method is the use of nanomaterials in the processing of the MEA, and nanomaterials are prone to agglomeration and rheological challenges due to their high surface area of interaction. Additionally, the use of nanomaterials in manufacturing has come under scrutiny because of the ability of the nanomaterials to penetrate the skin. Further, nanomaterials may become airborne if not handled properly. One drawback to alloying platinum with other metals is the additional processing to transform the alloy into nanomaterials that may pose the same risks as Pt/C nanoparticles during manufacturing. Another drawback to using platinum nanoparticles (versus micro-sized Pt particles) is the difference in cost, which may be substantial.

The present disclosure relates to patterned platinum-coated PEM materials and methods of forming patterned platinum-coated PEM materials. In the present disclosure, a laser may be utilized to process a portion of a polymeric material that is coated with a platinum catalyst ink in order to form a patterned platinum-coated PEM material having an increased catalytic surface area. The platinum catalyst ink may include low surface area platinum particles, which may be less expensive than high surface area platinum particles, such as platinum nanoparticles. Further, the use of low surface area platinum particles may avoid the safety risks associated with the use of nanoparticles during manufacturing.

Prior to laser processing, the polymeric material that is coated with low surface area platinum particles may have a first set of surface features (also referred to herein as "microscale surface features"). Laser processing may result in formation of a second set of surface features (also referred to herein as "nanoscale surface features") in the laser processed portion of the platinum-coated polymeric material. Prior to laser processing, the platinum-coated polymeric material may have a first catalytic surface area. After laser processing, the patterned platinum-coated PEM material may have a second catalytic surface area that is greater than the first catalytic surface area. The change of catalytic surface area may be associated with the formation of the second set of "nanoscale" surface features.

An article of manufacture, such as a membrane electrode assembly or a PEMFC, may include the patterned platinum-coated PEM material of the present disclosure. The increase in catalytic surface area resulting from laser processing of a platinum-coated polymeric material may result in improved fuel cell efficiency. Further, utilizing a laser to pattern a platinum-coated polymeric material may allow for relatively inexpensive low surface area platinum particles to be used in a platinum catalyst ink solution. In addition, the drawbacks/hazards associated with the use of platinum nanomaterials during manufacturing may be avoided.

FIG. 1 is a diagram 100 that illustrates an example of a process of forming a patterned platinum-coated PEM material for use in a PEMFC. FIG. 1 illustrates that the patterned platinum-coated PEM material may be formed by utilizing a laser to process a portion of a platinum-coated polymeric material. Prior to laser processing, the platinum-coated polymeric material may have a first catalytic surface area. After laser processing, the patterned platinum-coated PEM material may have a second catalytic surface area that is greater than the first catalytic surface area, resulting in a PEM material with improved catalytic efficiency. As illustrated and further described herein with respect to FIG. 2, the increase in catalytic surface area may be associated with the formation of a second set of surface structures ("nanostructures") as a result of the laser processing.

In the particular embodiment illustrated in FIG. 1, a PEMFC 102 includes a membrane electrode assembly (MEA) 104. The membrane electrode assembly 104 includes a first gas diffusion electrode 106, a second gas diffusion electrode 108, and a patterned platinum-coated PEM material 110 disposed between the first gas diffusion electrode 106 and the second gas diffusion electrode 108. FIG. 1 illustrates an example of a process of forming the patterned platinum-coated PEM material 110 of the membrane electrode assembly 104. In the example of FIG. 1, a platinum catalyst ink 112 may be applied to a polymeric substrate 114 to form a platinum-coated material 116 having a first catalytic surface area.

FIG. 1 further illustrates that a laser 118 may be utilized to process the platinum-coated material 116 by applying laser pulses 120 to a portion 122 of the platinum-coated polymeric material 116 to form the patterned platinum-coated PEM material 110. The portion 122 of the platinum-coated polymeric material 116 may correspond to an area where fuel (e.g., hydrogen) diffuses via the first gas diffusion electrode 106 (e.g., an anode) in the assembled PEMFC 102. As described further herein, the patterned platinum-coated PEM material 110 may have a second catalytic surface area that is greater than the first catalytic surface area of the platinum-coated polymeric material 116.

In the example illustrated in FIG. 1, the first gas diffusion electrode 106 corresponds to a gas diffusion anode (e.g., for hydrogen gas diffusion), and the second gas diffusion electrode 108 corresponds to a gas diffusion cathode (e.g., for oxygen gas diffusion). FIG. 1 illustrates that the platinum catalyst material (applied to the portion 122 of the polymeric substrate 114) is disposed on a first surface of the patterned platinum-coated PEM material 110 that is adjacent to the gas diffusion anode in the assembled PEMFC 102. FIG. 1 further illustrates that, in some cases, a second surface of the patterned platinum-coated PEM material 110 that is adjacent to the gas diffusion cathode may not include platinum catalyst material that is patterned using the laser 118. In other cases, the second surface may be patterned using the laser 118, with an associated increase in hydrophobicity potentially improving the ability to dispel water that is generated at the cathode side of the FEMFC 102.

In operation, the polymeric substrate 114 may be formed by casting a solution of an ionomer (e.g., a sulfonated tetrafluoroethylene based fluoropolymer-copolymer) and swelling the ionomer with a solvent (or multiple solvents). In a particular embodiment, the ionomer may include a perflourinated membrane material (e.g., having a thickness of 0.002 inches). Swelling the ionomer with solvent(s) may prevent the membrane material from swelling or wrinkling when the solvent(s) from the platinum catalyst ink 112 are applied. Examples of solvents may include water, alcohol(s), polar aprotic solvent(s), or a combination thereof (among other alternatives).

In a particular embodiment, the platinum catalyst ink 112 may include a homogeneous platinum catalyst ink that is prepared by dispersing low surface area platinum particles into ionomer, solvent, and water. As an example, the low surface area platinum particles may have a characteristic dimension of not less than 1 micron (e.g., less than or equal to 20 microns, among other alternatives). Other preparations of platinum catalyst ink may be selected by one of ordinary skill in the art. The platinum catalyst ink 112 may be applied to the polymeric substrate 114 (that is swollen with solvent). As shown in the example of FIG. 1, the platinum catalyst ink 112 may be applied to the portion 122 of the polymeric substrate 114 corresponding to an area of fuel flow (e.g., hydrogen flow) in the adjacent gas diffusion electrode 106 of the assembled PEMFC 102. In a particular embodiment, the platinum catalyst ink 112 may be spray coated onto the swollen polymeric substrate 114 (e.g., at about 150° C.).

After applying the platinum catalyst ink 112 to the polymeric substrate 114 (also referred to as "dying" the polymeric substrate 114), the laser 118 may be used to increase the catalytic surface area of the low surface area platinum particles from the platinum catalyst ink 112 that were applied to the polymeric substrate 114. In a particular embodiment, the laser 118 may include a Ti:sapphire laser system to "convert" the low surface area platinum particles dispersed in the platinum catalyst ink 112 into high surface area platinum. In some cases, an amount of platinum that is dispersed in the platinum catalyst ink 112 may be reduced due to the increased surface area that results from the laser processing, thereby reducing the cost associated with the use of precious metal catalyst for a PEMFC. As an illustrative, non-limiting example, laser processing may include generating 65 femtosecond pulses with a central wavelength of 800 nm and at a maximum pulse repetition rate of 1 KHz. For processing platinum, a laser fluence of about 9.8 J/cm$^2$ may be selected, in some cases. In other cases, different pulses, wavelengths, pulse repetition rates, laser fluences, or a combination thereof may be selected (e.g., to reduce a risk of damage to the underlying polymeric substrate).

As illustrated and further described herein with respect to FIG. 2, in a non-limiting illustrative example, laser processing of the platinum-coated polymeric material 116 may result in a grooved surface. In other cases, the laser 118 may be used to form a different pattern (e.g., a grid, a company logo, etc.). In another embodiment, laser processing may be performed on low surface area platinum particles before the platinum particles are added to the platinum catalyst ink 112. While this approach may include manufacturing hazards/risks that are similar to the use of platinum nanoparticles, in some cases laser processing of low surface area platinum particles to form the nanoscale features may be less expensive than other sources of platinum nanoparticles.

After laser processing, FIG. 1 illustrates that the patterned platinum-coated PEM material 110 may be hot pressed between gas diffusion layers to form the membrane electrode assembly 104. In alternative embodiments, the membrane electrode assembly 104 may be formed by a catalyst coated on electrode (CCE) process or a decal transfer catalyst coated on membrane (DTM) process, among other alternatives. FIG. 1 illustrates that the membrane electrode assembly 104 (that includes the patterned platinum-coated PEM material 110) may be incorporated into the PEMFC 102.

Thus, FIG. 1 illustrates an example of a PEMFC that includes a patterned platinum-coated PEM material and an example of a process of forming the patterned platinum-coated PEM material. As illustrated and further described herein with respect to FIG. 2, utilizing a laser to pattern a portion of a platinum-coated polymeric material may result in the formation of a second set of surface features ("nanoscale surface features") with increased catalytic surface area. The increased catalytic surface area may allow for a reduction in an amount of platinum material that is applied to a polymeric material during formation of a proton exchange membrane portion of a PEMFC. Further, the increased catalytic surface area may enable the use of low surface area platinum particles that are less expensive (and potentially safer) than high surface area platinum nanoparticles.

FIG. 2 is a diagram 200 illustrating an example in which laser processing of a portion of a platinum-coated polymeric material that includes a first set of surface features results in formation of a second set of surface features. The second set of surface features that are formed by laser processing may be associated with an increased catalytic surface area of a platinum-coated PEM material. The increased catalytic surface area may allow for a reduction in an amount of platinum material that is applied to a polymeric material during formation of a proton exchange membrane (e.g., as illustrated in the example process of FIG. 1). In the example illustrated in FIG. 2, the laser processed portion may correspond to the portion 122 of the platinum-coated polymeric material 116 of FIG. 1 (e.g., an area of fuel exposure in an assembled PEMFC).

FIG. 2 illustrates that a first portion 202 of the patterned platinum-coated PEM material 110 includes a first set of surface features (also referred to herein as "microscale surface features"). In a particular embodiment, the first set of surface features may have a feature size that is not less than 1 micron. FIG. 2 further illustrates that a second portion 204 of the patterned platinum-coated PEM material 110 includes a second set of surface features (also referred to herein as "nanoscale surface features"). In a particular embodiment, the second set of surface features may have a feature size that is in a range of 1 nm to 100 nm.

In some cases, a result of the laser processing is that the platinum metal surface becomes superhydrophobic. For example, in some cases, the patterned platinum-coated PEM material 110 may have a water contact angle of not less than 120° (at a tilt angle of) 8°, such as not less than 150° (at a tilt angle of 8°). In the context of proton exchange membranes, wetting of a surface of the membrane may be desirable. While the superhydrophobic properties of the metal surface may reduce wetting, overall catalytic activity may increase. That is, while a superhydrophobic material may be associated with reduced wetting, an order of magnitude change of surface area that results from the laser processing may offset the effects of reduced wetting. In some cases, the patterned platinum-coated PEM material 110 may have a reflectance value in a range of 1.3 percent to 3.5 percent for light having a wavelength in a range of 0.4 μm to 0.7 μm.

Thus, FIG. 2 illustrates an example of "nanoscale surface features" that are formed by laser processing of a portion of a platinum-coated polymeric material. Prior to laser processing, the platinum-coated polymeric material may have a first set of "macroscale surface features" corresponding to low surface area platinum particles (e.g., dispersed in the platinum catalyst ink 112 applied to the polymeric substrate 114, as illustrated in FIG. 1). The "nanoscale surface features" that result from laser processing may increase the catalytic surface area, resulting in improved PEMFC fuel cell efficiency without the use of expensive and potentially hazardous high surface area platinum nanoparticles.

FIG. 3 is an example of a process 300 of forming an article of manufacture that includes a patterned platinum-coated PEM material. In FIG. 3, a laser may be utilized to form a patterned platinum-coated PEM material, and the patterned platinum-coated PEM material may be used to form a membrane electrode assembly portion of a PEMFC. In some cases, the same entity or multiple entities may perform one or more of the operations illustrated in the example of FIG. 3. To illustrate, one entity may perform laser processing to form a patterned platinum-coated PEM material, the same entity or a different entity may form an MEA that includes the patterned platinum-coated PEM material, and the same entity or a different entity may incorporate the MEA into a PEMFC.

The process 300 includes applying a platinum catalyst ink solution to a polymeric substrate to form a platinum-coated polymeric material having a first catalytic surface area, at 302. For example, referring to FIG. 1, the platinum catalyst ink 112 may be applied to the polymeric substrate 114 to form the platinum-coated material 116 having the first catalytic surface area.

The process 300 includes utilizing a laser to process a portion of the platinum-coated polymeric material to form a patterned platinum-coated PEM material, at 304. The patterned platinum-coated PEM material has a second catalytic surface area that is greater than the first catalytic surface area. For example, referring to FIG. 1, the laser 118 may apply the laser pulses 120 to the portion 122 of the platinum-coated polymeric material 116 to form the patterned platinum-coated PEM material 110 having the second catalytic surface area. As illustrated and further described herein with respect to FIG. 2, the increased catalytic surface area may be associated with the formation of a second set of surface structures (e.g., nanostructures) as a result of the laser processing.

In the particular embodiment illustrated in FIG. 3, the process 300 includes forming a membrane electrode assembly, at 306. The membrane electrode assembly includes a first gas diffusion electrode, the patterned platinum-coated PEM material, and a second gas diffusion electrode. For example, referring to FIG. 1, the membrane electrode assembly 104 may be formed by hot pressing the first gas diffusion electrode 106, the patterned platinum-coated PEM material 110, and the second gas diffusion electrode 108. As shown in the example of FIG. 1, the first gas diffusion electrode 106 may correspond to an anode that is disposed on a first side of the patterned platinum-coated membrane material 110 that includes the portion 122 that is laser processed to increase the catalytic surface area. The second gas diffusion electrode 108 may correspond to a cathode that is disposed on a second side of the patterned platinum-coated membrane material 110, where the second side may not include patterned platinum catalyst material.

In the particular embodiment illustrated in FIG. 3, the process 300 further includes forming a proton exchange membrane fuel cell assembly that includes the membrane electrode assembly, at 308. For example, referring to FIG. 1, the membrane electrode assembly 104 may be incorporated into the PEMFC 102 (e.g., by a fuel cell manufacturer that may or may not be the same entity that formed the patterned platinum-coated PEM material 110).

Thus, FIG. 3 illustrates an example of a process of forming an article of manufacture that includes a patterned platinum-coated PEM material. In some cases, the article of manufacture may include a membrane electrode assembly that includes the patterned platinum-coated PEM material. In other cases, the article of manufacture may be a PEMFC having a membrane electrode assembly that includes the patterned platinum-coated PEM material.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An article of manufacture comprising a patterned platinum-coated proton exchange membrane (PEM) material, wherein the patterning of the patterned platinum-coated PEM material provides a water contact angle of not less than 120° at a tilt angle of 8°.

2. The article of manufacture of claim 1, wherein a first portion of the patterned platinum-coated PEM material includes microscale surface features, and wherein a second portion of the patterned platinum-coated PEM material includes nanoscale surface structures having a feature size in a range of 1 nm to 100 nm.

3. The article of manufacture of claim 1, wherein, for a tilt angle of 8°, the patterned platinum-coated PEM material has a water contact angle of not less than 150°.

4. The article of manufacture of claim 1, wherein the patterned platinum-coated PEM material has a reflectance value in a range of 1.3 percent to 3.5 percent for light having a wavelength in a range of 0.4 µm to 0.7 µm.

5. The article of manufacture of claim 1, further comprising a membrane electrode assembly that includes a first gas diffusion electrode and a second gas diffusion electrode, and wherein the patterned platinum-coated PEM material is disposed between the first gas diffusion electrode and the second gas diffusion electrode.

6. A proton exchange membrane fuel cell (PEN/WC) comprising:
a first gas diffusion electrode; a second gas diffusion electrode; and
a patterned platinum-coated proton exchange membrane (PEM) material disposed between the first gas diffusion electrode and the second gas diffusion electrode, wherein the patterning of the patterned platinum-coated PEM material provides a water contact angle of not less than 120° at a tilt angle of 8°.

7. The PEN/WC of claim 6, wherein a first portion of the patterned platinum-coated PEM material includes microscale surface structures, and wherein a second portion of the patterned platinum-coated PEM material includes nanoscale surface structures having a feature size in a range of 1 nm to 100 nm.

8. The PEMFC of claim 6, wherein the first gas diffusion electrode includes a gas diffusion anode, wherein the second gas diffusion electrode includes a gas diffusion cathode, and wherein platinum catalyst material is disposed on a first surface of the patterned platinum-coated PEM material that is adjacent to the gas diffusion anode.

9. The PEMFC of claim 8, wherein a second surface of the patterned platinum-coated PEM material that is adjacent to the gas diffusion cathode does not include laser patterned platinum catalyst material.

* * * * *